United States Patent [19]

Hirata et al.

[11] Patent Number: 5,062,275

[45] Date of Patent: Nov. 5, 1991

[54] AUTOMOTIVE AIR CONDITIONER

[75] Inventors: Toshio Hirata, Anjo; Kenji Ogura, Kariya; Takehito Mizutani, Oobu, all of Japan

[73] Assignee: Nippondenso Co., Ltd., Kariya, Japan

[21] Appl. No.: 489,188

[22] Filed: Mar. 8, 1990

[30] Foreign Application Priority Data

Mar. 9, 1989 [JP] Japan .................................. 1-54994
Mar. 11, 1989 [JP] Japan .................................. 1-58602

[51] Int. Cl.$^5$ ............................................. F25B 41/00
[52] U.S. Cl. ......................................... 62/174; 62/502
[58] Field of Search ......................... 62/174, 114, 502

[56] References Cited

U.S. PATENT DOCUMENTS

| | | | |
|---|---|---|---|
| 2,277,138 | 3/1942 | Newton | 62/114 X |
| 4,179,898 | 12/1979 | Vakil | 62/174 X |
| 4,913,714 | 4/1990 | Ogura et al. | 62/174 X |

FOREIGN PATENT DOCUMENTS

| | | |
|---|---|---|
| 62-280555 | 12/1987 | Japan . |
| 62-280556 | 12/1987 | Japan . |
| 63-123961 | 5/1988 | Japan . |
| 63-129253 | 6/1988 | Japan . |
| 63-153367 | 6/1988 | Japan . |
| 63-294459 | 12/1988 | Japan . |
| 64-38569 | 2/1989 | Japan . |
| 64-63754 | 3/1989 | Japan . |

*Primary Examiner*—William E. Wayner
*Attorney, Agent, or Firm*—Cushman, Darby & Cushman

[57] ABSTRACT

An automotive air conditioner using a mixed type coolant of a higher boiling point coolant and a lower boiling point coolant. The air conditioner employs a stacking container connecting to an upper portion of a receiver for introducing a gas phased coolant which contains much of the lower boiling point coolant via a first valve. The stacking container is also connected to a suction side of a compressor via a second valve. The air conditioner becomes a mixing mode when the first valve closes a conduit and the second valve opens a conduit for introducing the lower boiling point coolant into a refrigerant circuit. The cooling ability is increased during the mixing mode. The air conditioner becomes a separating mode when the first valve opens the conduit and the second valve closes the conduit for separating the lower boiling point coolant circulating in the refrigerant circuit and stacking the same in the container. The consuming energy for operating the refrigerant circuit is decreased during the separating mode.

9 Claims, 12 Drawing Sheets

FIG.4
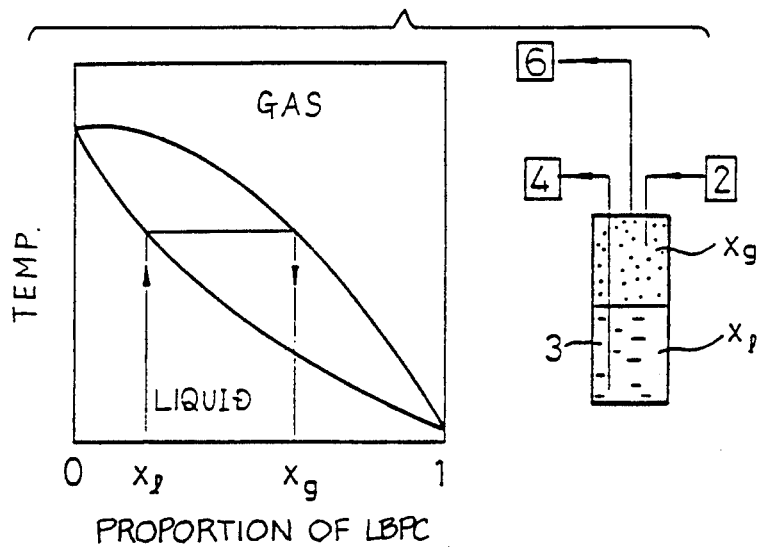
FIG.5A
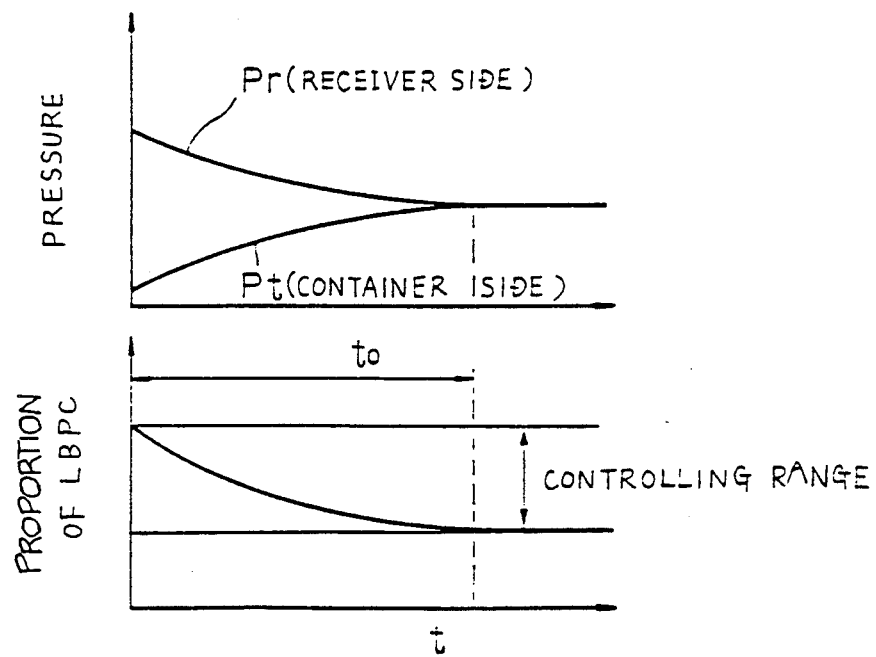
FIG. 5B

SEPARATING MIX
MOOD MOOD

AUTOMOTIVE AIR CONDITIONER

FIELD OF THE INVENTION

A present invention relates to an automotive air conditioner which can vary a cooling efficiency thereof. The automotive air conditioner of the present invention employs a mixed type coolant mixing a lower boiling point coolant and a higher boiling point coolant.

BACKGROUND OF THE INVENTION

A conventional automotive air conditioner has used single coolant such as R12. Therefore, the constituent of the coolant circulating in a refrigerant circuit is not changed during the operation of the automotive air conditioner.

Since the cooling efficiency of the automotive air conditioner mainly depends on the capacity of a compressor which is also dependent on the engine speed, each part of the automotive air conditioner, such as the compressor, a condenser or an evaporator should have enough capacity to have a sufficient cooling efficiency even under the condition that the engine speed is not high, an idling condition for instance.

Some residential air conditioners a heat pump for example, use a mixed type coolant, the boiling temperatures of each component being different from the other. The mixed type coolant for the residential heat pump has been used for compensating a heating efficiency when the outdoor temperature is low. In other words, the mixed type coolant of the residential heat pump has not been used for increasing the cooling efficiency or for controlling the cooling efficiency of the air conditioner.

Since the volume of the coolant circulating in the refrigerant circuit of the residential heat pump is much smaller than that of the automotive air conditioner, and since the discharge volume of the compressor used in the residential heat pump is constant, the mixed type coolant used for the residential heat pump could not have been used for the automotive air conditioner.

SUMMARY OF THE INVENTION

An object of the present invention is to increase the cooling efficiency of the automotive air conditioner when the same needs high efficiency such as the condition immediately after the air conditioner starts or the condition when the engine speed is low. The air conditioner of the present invention can reduce the cooling efficiency thereof after the temperature of a compartment room is reduced to a target temperature, so that consuming energy for operating the conditioner is reduced.

Another object of the present invention is to provide an automotive air conditioner which can vary the cooling efficiency thereof within a short period.

The automotive air conditioner of the present invention can operate a mixing mode that the lower boiling point coolant stacked in a stacking container is withdrawn to a main circuit, of the refrigerant circuit a constituent of the coolant circulating in which is mainly the higher boiling coolant. By operating the mixing mode, the lower boiling point coolant from the stacking container is mixed to the higher boiling point coolant in the main circuit. Accordingly, the percentage of the lower boiling point coolant circulating in the main circuit is increased, and it causes an increase in the volume of the coolant evaporating in the evaporator even though the flow rate of the coolant is constant. Therefore, the cooling ability of the evaporator is increased, and the air conditioner can cool the compartment room quickly.

The automotive air conditioner of the present invention can operate a separating mode in which gas phase coolant in the upper portion of a receiver is forced toward the stacking container by the discharge pressure from the compressor. Therefore, the lower boiling point coolant circulating in the main circuit is separated and stacked within the container. In other words, the component of the coolant circulating in the main circuit becomes the condition that the higher boiling point coolant is rich. Though it causes the cooling efficiency of the air conditioner to be reduced, the air conditioner does not need much cooling efficiency after the temperature in the compartment room is reduced to the target temperature. Furthermore, since the higher boiling point coolant does not require much energy for liquidizing thereof, the consuming energy of the compressor can also be reduced.

BRIEF DESCRIPTION OF THE DRAWINGS

FIG. 4 explains the differences in the phase change conditions between higher and lower boiling point coolant in a receiver, FIG. 5A and 5B explain the condition of the coolant when the lower boiling point coolant is separated.

DETAILED DESCRIPTION OF THE PREFERRED EMBODIMENTS

Figure 1:
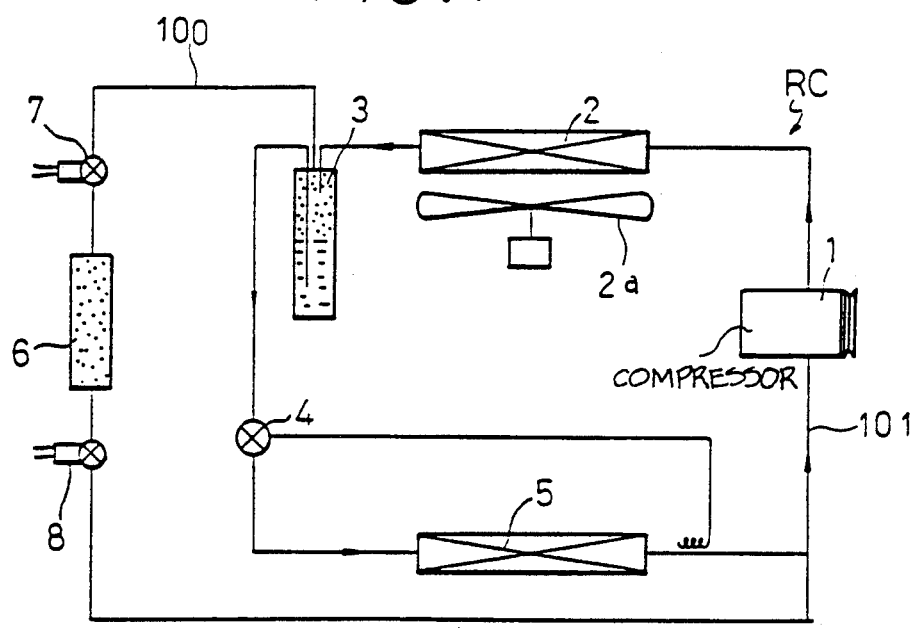
FIG. 1 shows a refrigerant circuit of the present invention.

The refrigerant circuit of the present invention is explained by using FIG. 1. Numeral 1 designates a compressor driven by an automotive engine, numeral 2 shows a condenser located at a front portion of an engine room, cooling air is blown by a cooling fan 2A, numeral 3 shows a receiver provided at a side portion of the condenser 2. The condensed coolant is separated to gas phase and liquid phase within the receiver 3. Numeral 4 shows an expansion valve which controls the quantity of the coolant flowing into an evaporator 5 for maintaining the temperature of the evaporator 5. The evaporator 5 is located in a compartment room. One end of a separate conduit 100 is opened at the upper portion of the receiver 3 so that the gas phase coolant in the receiver 3 can flow to a stacking container 6. The one end of the separating conduit 100 also can be opened to a conduit between the condenser 2 and the receiver 3 instead of the receiver 3. Another end of the separating conduit 100 is connected to the conduit 101 between the evaporator 5 and the compressor 1, namely lower pressurized portion of the refrigerant circuit. A first electromagnetic valve 7 is provided at the upper stream of the stacking container 6 and a second electromagnetic valve 8 is provided at the down stream of the stacking container 6. A controlling unit (ECU) controlling the operation of the first and second valves 7 is explained by using FIG. 2. Numeral 9 shows an A/D comparator, and numeral 10 shows a microcomputer which outputs the controlling signal to a first controlling circuit 11 which connects to the first valve 7 and a second controlling circuit 12 which connects to the second valve 8.

Figure 3:
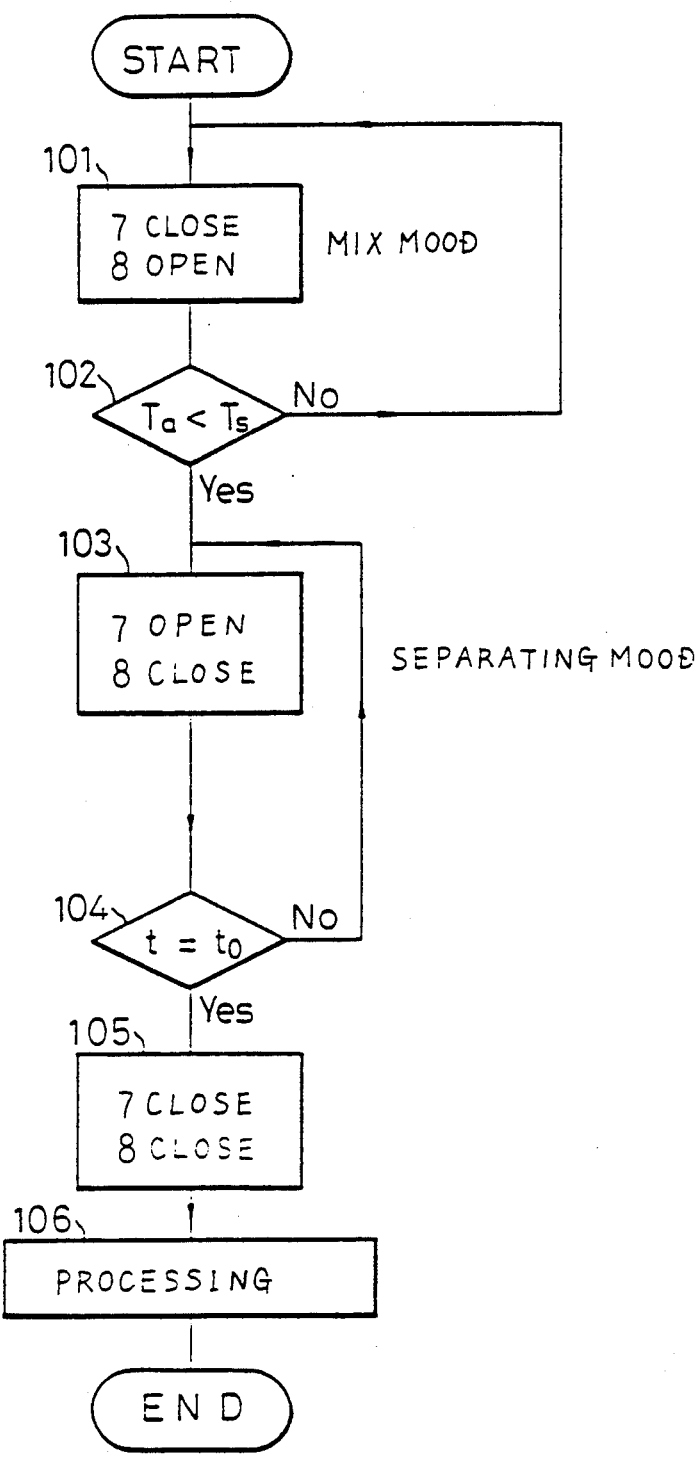
FIG. 3 is a flowchart explaining an operating program of the controlling unit.

A mixed coolant of a higher boiling point coolant (HBPC), R12 for instance, and a lower boiling point coolant (LBPC), R13, R14 or R23 for instance, is used for the refrigerant circuit shown in FIG. 1. An operation program of the controlling unit (ECU) is explained by using a flowchart of FIG. 3. The flow shown in FIG. 3 is continuously performed every short period. Controlling unit (ECU) outputs a signal for closing the first valve 7 and for opening the second valve 8 (step 101). The step 101 shows a mixing mode which is used when the high cooling efficiency is required such as immediately after the automotive air conditioner starts. Since the lower boiling point coolant is mixed to the coolant circulating in the main circuit, the refrigerant circuit can increase the cooling ability thereof. The lower boiling point coolant stacked in the container 6 is withdrawn by the compressor 1 when the second valve 8 opens the conduit 100, and the withdrawn lower boiling point coolant is mixed to the higher boiling point coolant within the refrigerant circuit. The lower boiling point coolant in the refrigerant circuit can increase the cooling ability, so that the temperature in the compartment room can be decreased quickly even though the engine speed is not so high.

The temperature in the compartment room Ta is compared to the target setting temperature Ts (step 102). When the temperature Ta is lower than the setting temperature Ts, the first valve 7 is opened and the second valve 8 is closed (step 103). The condition of the step 103 is a separating mode that the gas phase coolant in the upper portion of the receiver 3, namely the coolant in which the lower boiling point coolant is rich is separated from the refrigerant circuit Rc and stacked in the container 6. The component of the coolant in the upper portion of the receiver 3 is explained by using FIG. 4. Since the pressure in the container 6 is decreased by a suction pressure of the compressor 1 while during the mixing mode, there exists some pressure difference between the receiver 3 to be Pr and the container 6, such pressure difference causes the coolant in the receiver 3 forced into the container 6. A predetermined time To later (step 104), the pressure in the container 6 Pt becomes equal to the pressure Pr in the receiver 3, so that the first valve 7 is closed (step 105). Since the second valve 8 is also closed, a main part of the lower boiling point coolant in the refrigerant circuit Rc is stacked within the container 6, so that the main component of the coolant circulating in the refrigerant circuit Rc becomes the condition that the higher boiling point coolant is rich, and the volume of the coolant recirculating the circuit Rc is reduced. Therefore, the cooling ability of the air conditioner is reduced. However, the air conditioner can maintain the temperature in the compartment room by consuming a small amount energy. FIG. 5 shows the condition of the separating mode. A coordinate of FIG. 5 represents time and an ordinate of FIG. 5 represents the pressure and the component of the coolant.

Figure 2:
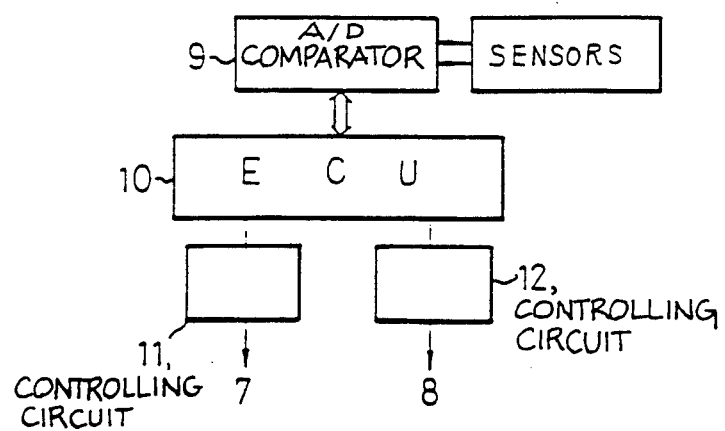
FIG. 2 shows a controlling unit for the refrigerant circuit shown in FIG. 1.
Figure 6:
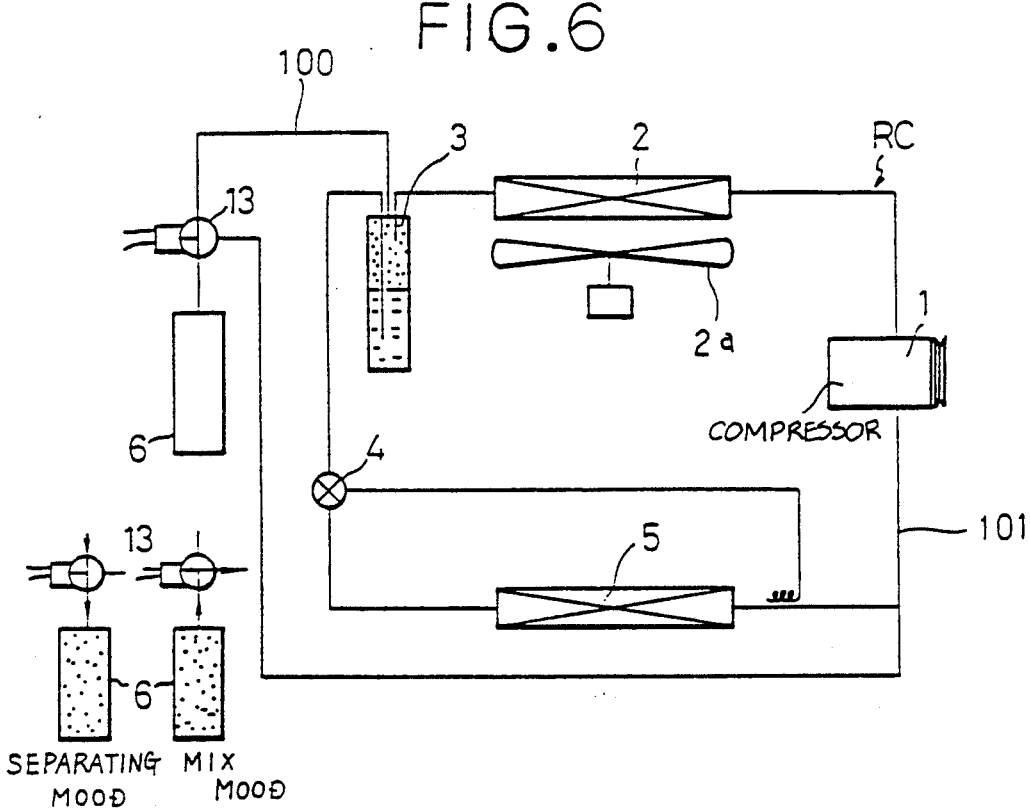
FIG. 6 shows a refrigerant circuit of a second embodiment of the present invention.
Figure 7:
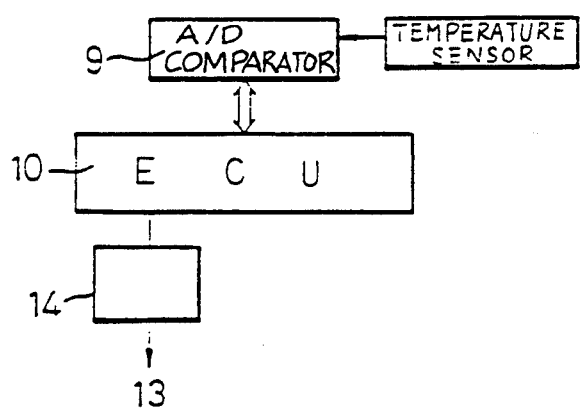
FIG. 7 shows a controlling unit used for the refrigerant circuit shown in FIG. 6.

As described above, a first embodiment of the present invention shown in FIGS. 1 through 3, has the first and second valves 7 provided on the upper stream and down stream of the container 6 respectively. A second embodiment of the present invention shown in FIG. 6 employs a single switching valve 13 instead of the first and the second valves 7 and 8. The switching valve 13 is provided at the conjunction point of the receiver 3, the suction side of the compressor 1 and the container 6, so that the switching valve 13 can operate the same as the first and the second valves 7 and 8 of the first embodiment. The controlling unit for controlling the switching valve 13 is explained by using FIG. 7. Numeral 14 designates a controlling circuit which controls the operation of the switching valve 13. The operation of the controlling circuit 14 is controlled by the microcomputer 10.

Though the first and the second valves 7 and 8 of the first embodiment and the switching valve 13 of the second embodiment are electromagnetic values, the valve for the present invention can be other than the electromagnetic valve, the valve manipulated by an air pressure or an oil pressure, for instance, can also be used.

Figure 8:
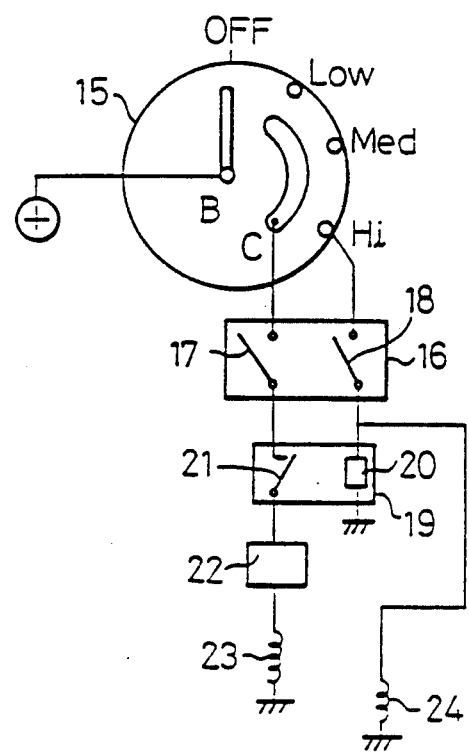
FIG. 8 shows another embodiment of the controlling unit, FIG. 9 explains the efficiency of the air conditioner of the present invention.

Though the mixing mode and the separating mode of the first and second embodiment is switched by the microcomputer 10 automatically, the operator can switch the mixing mode and the separating mode manually. In the third embodiment shown in FIG. 8, the mixing mode and the separating mode is switched in relation with a blower switch 15 which controls the blower speed of an air conditioning fan (not shown). The blower switch 15 shown in FIG. 8 has an arcuate contact C which contacts to the center contact B during the working condition of the fan even though the blower speed thereof is changed and another contact point Hi which contacts to the center point B only when the blower speed becomes high. Numeral 16 shows a relay which controls a magnetic crutch by which the driving force of the engine is transferred to the compressor 1 in accordance with a position of an A/C switch. A couple of contact points 17 and 18 are connected when the A/C switch is turned on. Numeral 19 shows a normally closed type relay which opens a point 21 when a coil 20 is energized. Numeral 22 shows a timer which opens a circuit after a predetermined time has passed. Numerals 23 and 24 show a solenoid coils of the first electromagnetic valve 7 and the second electromagnetic valve 8 shown in FIG. 1, respectively. The relay 16 opens the contact 21 when the blower switch 15 is in the "Hi" position, so that the coil 24 is energized and, consequently, the second electromagnetic valve 8 is opened. Therefore, the air conditioner enters the mixing mode when the blower switch turns to the "Hi" position. When the operator changes the blower switch to "Med" position or "Low" position, the electric current is supplied to the coil 24 through the C point, the relay point 17, the relay point 21 and the timer 22, however the electric current is not supplied to the coil 24. Therefore, the first electromagnetic valve 7 is opened and the second electromagnetic valve 8 is closed (separating mode). The gas phased coolant in the upper portion of the receiver 3 is transferred to the container 6. After the predetermined time controlled by the timer 22 has passed, the coil 23 becomes energized, so that both the first and the second valves 7 and 8 are closed for holding the coolant within the container 6. As explained above, the mixing mode and the separating mode are switched in relation to the blower speed. Such switching between the mixing mode and the separating mode is also controlled other than by the blower speed, an introducing air switching damper which switches a recirculating condition and a fresh air introducing condition, a sun light detecting sensor, an opening angle of an air mix damper which controls the amount of an air passing through the evaporator 5, or an mode selecting damper which changed an opening position through which an air flows toward the compartment room, for instance, can be used. In other words, the mixing mode and the separating mode can be switched relating to the required cooling efficiency, or the consuming energy.

Figure 9:
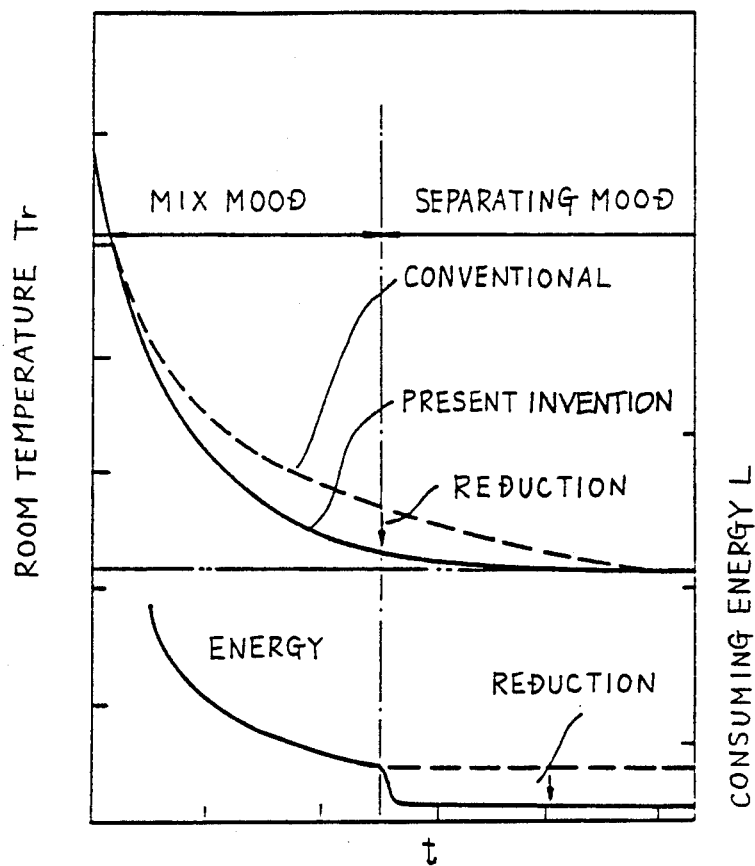

The efficiency of the automotive air conditioner relating to the present invention is compared to the conventional type air conditioner which uses the single coolant by using FIG. 9. As shown from FIG. 9, the air conditioner of the present invention can reduce the temperature in the compartment room more quickly than the conventional one. And the consuming energy for keeping the temperature can also be reduced.

Figure 10:
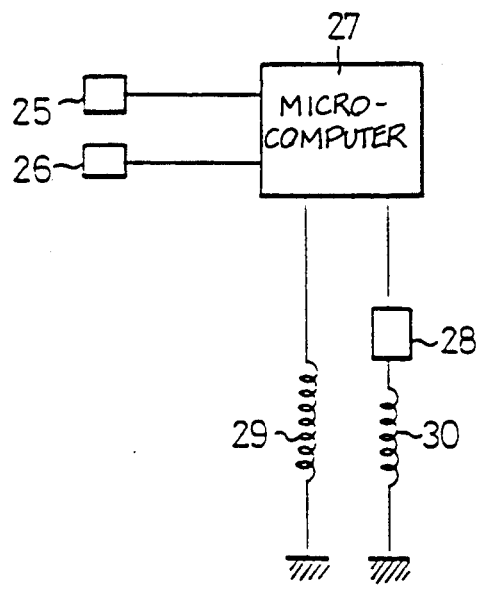
FIG. 10 shows another controlling unit used for the refrigerant circuit of the present invention.
Figure 11:
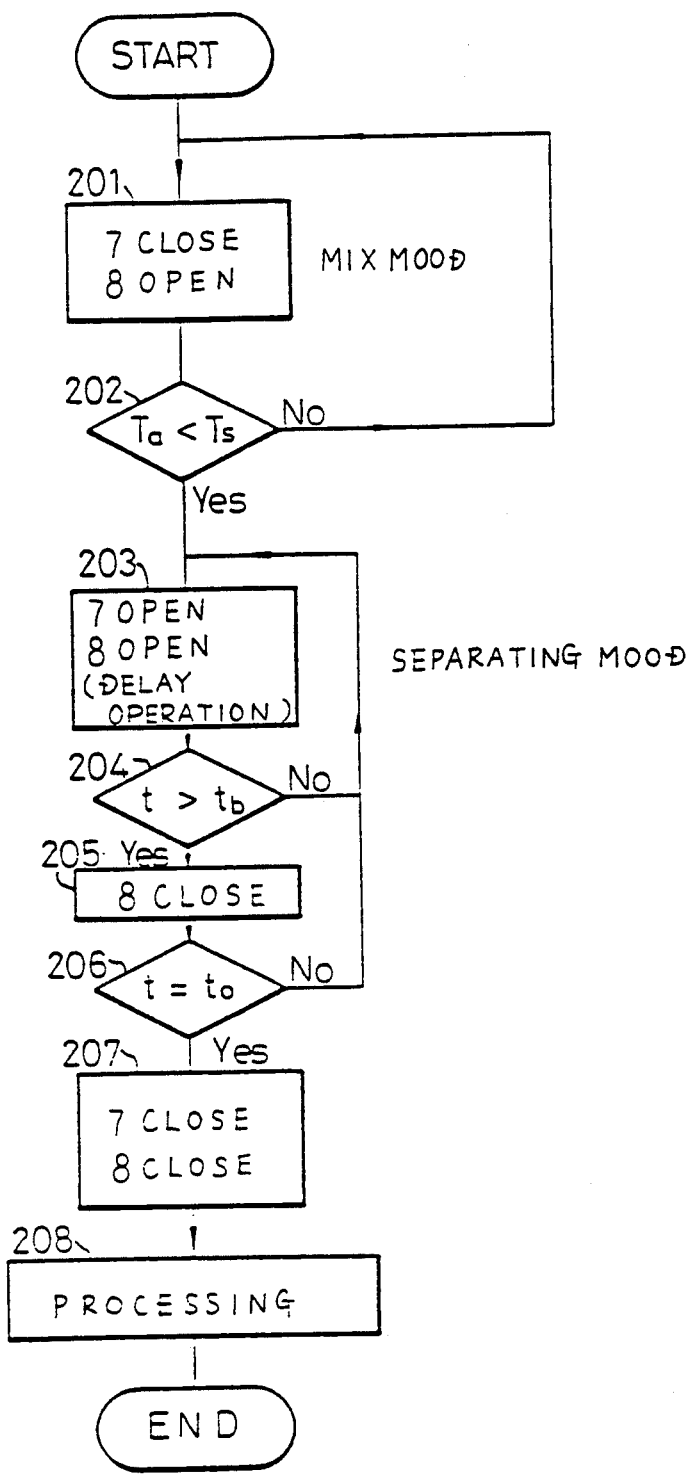
FIG. 11 is a flowchart explaining the operation of the controlling unit shown in FIG. 10, FIG. 12 explains the operation of the valves, FIGS. 13 through 16 explain the operation and effect relating to a movement of the valves shown in FIG. 12.
Figure 12:
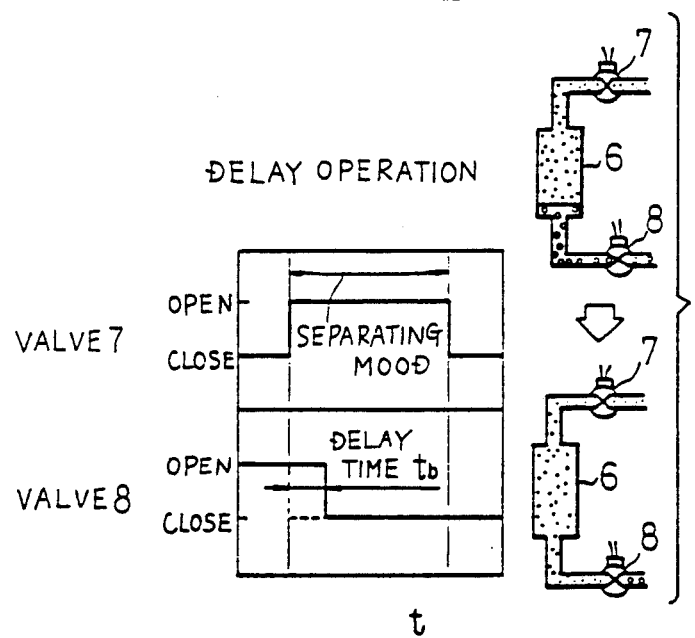

According to the investigation of the present inventors, the switching timing of the first valve 7 and the second valve 8 influences the ability of the refrigerant circuit. A controlling unit of the fourth embodiment of the present invention is described in FIG. 10, and the controlling program of the unit shown in FIG. 10 is also explained by the flowchart of FIG. 11. Numeral 25 shows a temperature detector which indicates the temperature in the compartment room, numeral 26 shows a setting means by which the operator set the target temperature. Numeral 27 shows a microcomputer, and numeral 28 shows a delay timer means. Numeral 29 represents the solenoid coil of the first electromagnetic valve 7 and numeral 30 represents the solenoid coil of the second electromagnetic valve 8. The flowchart shown in FIG. 11 differs from that shown in FIG. 3 by the steps 203, 204 and 205. At the step 203 (the starting point of the separating mode), the second valve 8 is continuously opened, and the delay timer means 28 starts to count the time from this point. Accordingly, both the first and the second valves 7 and 8 are opened during the predetermined period Pd. The coolant in the upper portion of the receiver 3 drives out the coolant in the container 6 toward the refrigerant circuit Rc. Since the coolant in the upper portion of the receiver 3 is rich in the lower boiling point coolant and since the coolant remaining in the container 6 contains the higher boiling point coolant, the driving step in which the lower boiling point coolant drives the higher boiling point coolant out, can increase the amount of the lower boiling point coolant stacked in the container 6. Because the volume of the container is limited from the viewpoint for being equipped in the automobile, the limited volume can be used more effectively by employing this driving step.

In other words, the automotive air conditioner described as the fourth embodiment can reduce the volume of the container 6 compared with that of the first embodiment shown in FIG. 1. According to the present inventors' experiments, about 3-6 seconds of the delay time Tb can reduce the volume of the container 6 as much as 10%. After predetermined delay period Tb has past(step 204), the second electromagnetic valve 8 is closed for holding the lower boiling point coolant (step 205). Steps 206, 207 and 208 work the same as those of the first embodiment shown in FIG. 3.

Figure 13:
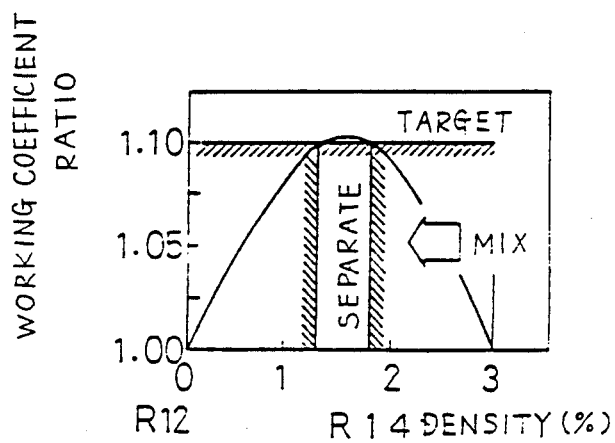

Under the special condition, the delay operation of the second valve 8 is not required. The second valve 8 is preferred to be closed simultaneously when the first valve 7 is opened such as explained in the first embodiment shown in FIG. 3, when the pressure of the coolant in the upper portion of the receiver 3 is high enough. As explaining by using FIG. 13, the mixed type coolant containing 3 percent of the lower boiling point coolant R14 can work most effectively (the working coefficient ratio is more than 1.10) when the percentage of the lower boiling point coolant R14 circulating in the main refrigerant circuit Rc is reduced between 1 and 2 %. The range of 1.1 of the working coefficient ratio is used as the target, so that the range more than 1.10 working efficient ratio is called "separating range".

Figure 14:
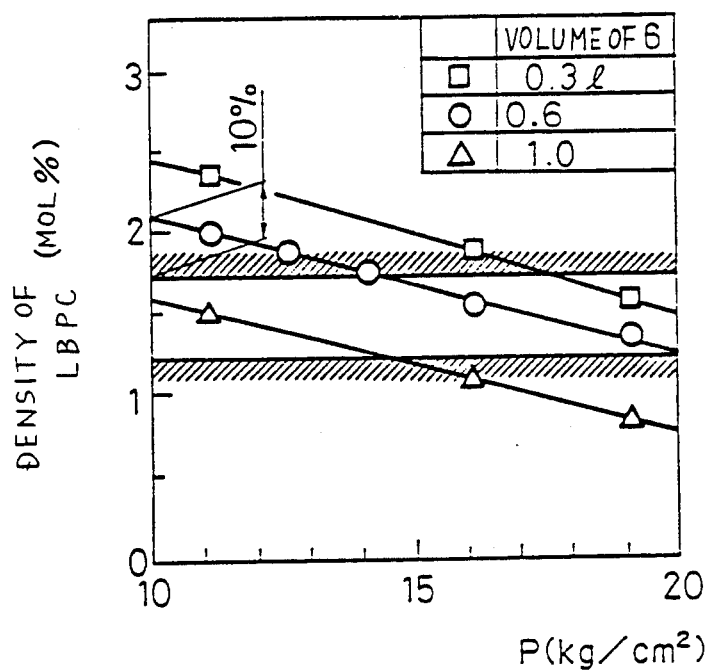
Figure 15:
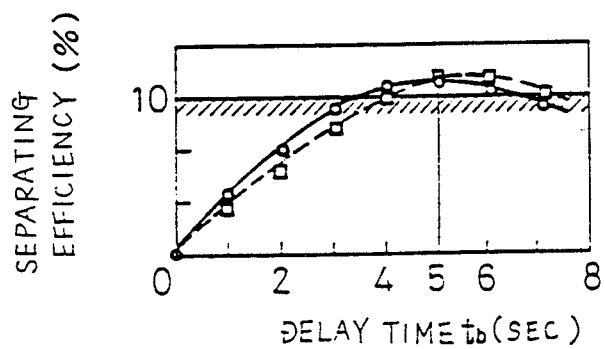

Since the quantity of the lower boiling point coolant R14 stacked in the container 6 depends upon the pressure in the receiver 3 or the volume of the container 6, the density of the lower boiling point coolant R14 in the main refrigerant circuit Rc can be controlled by setting the volume of the container 6 (shown in FIG. 14). Since the "separating range" of the lower boiling point coolant R14 is also varied in relation to the delay period Tb of the second valve 8 as explained by FIG. 15, the preferred period of the delay time Tb can be measured by using FIG. 15.

Figure 16:
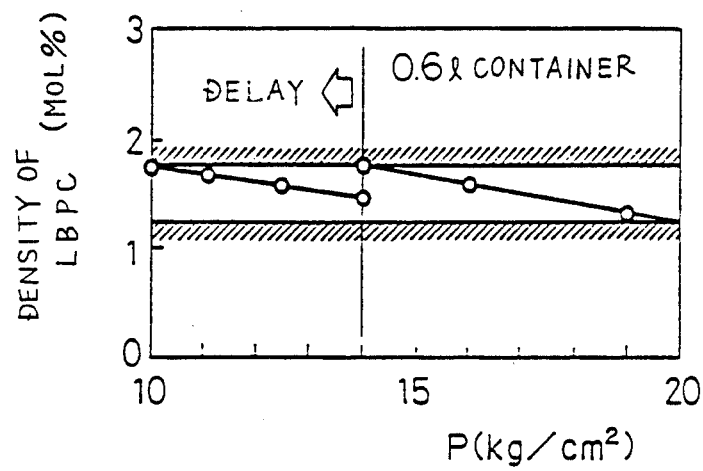

As explained above, the density of the lower boiling point coolant R14 circulating the main refrigerant circuit Rc can be kept within the "separating range" by operating the second valve 8 in accordance with the discharge pressure of the compressor. As to the automotive air conditioner having the container 6 the volume of which is 0.6l, the second valve 8 is operated with the delay time while the discharge pressure is low (10–14 kg/cm$^2$) and the second valve 8 is operated without any delay time while the discharge pressure of the compressor is high (14–20 Kg/cm$^2$) in order to keep the density of the lower boiling point coolant R14 in the main circuit Rc within the "separating range", as shown in FIG. 16.

In order to control the pressure within the receiver 3, it is preferred to control the operation of the fan 2a. Since the pressure in the receiver 3 is deeply dependent upon the condensing ability of the condenser 2, and since the condensing ability is controlled by the operation of the fan 2a, the pressure in the receiver can be increased by stopping the operation of the fan 2a.

Figure 17:
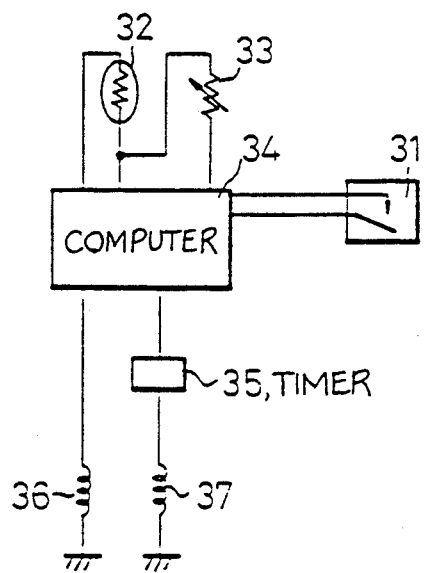
FIG. 17 shows another controlling unit used in the refrigerant circuit of the present invention.

FIG. 17 shows the fifth embodiment of the automotive air conditioner. The discharge pressure of the compressor, namely the pressure within the refrigerant circuit between the compressor and the expansion valve 4 is detected by a pressure switch 31 provided in the receiver 3 or the conduit 101 between the receiver 3 and the expansion valve 4. The output signal from the pressure switch 31 is reversed when the pressure becomes 14 Kg/cm². Since the discharge pressure is varied in accordance with an atmospheric temperature, a detector 32 which detects the atmospheric temperature is also employed. The output signals from the pressure switch 31, the detector 32 and a variable condenser 33 by which a target temperature is set enter the microcomputer 34. The output signal from the computer 34 enters a first solenoid coil 36 of the first electromagnetic valve 7 and a solenoid coil 37 of the second electromagnetic valve 8 through a delay timer means 35.

The control unit of the fifth embodiment can decide whether the delay time of the second valve 8 (the step 203 shown in FIG. 11) is required by detecting the discharge pressure detected by the pressure switch 31 and the atmospheric temperature detected by the detector 32. If the computer decides that the delay time is required, the computer 34 operates per the same flowchart shown in FIG. 11, and if that computer 34 does not decide the delay time is required, the computer operates per the same flowchart shown in FIG. 3. Accordingly, the computer 34 can maintain the density of the lower boiling point coolant in the refrigerant circuit Rc within the "separating range".

Figure 18:
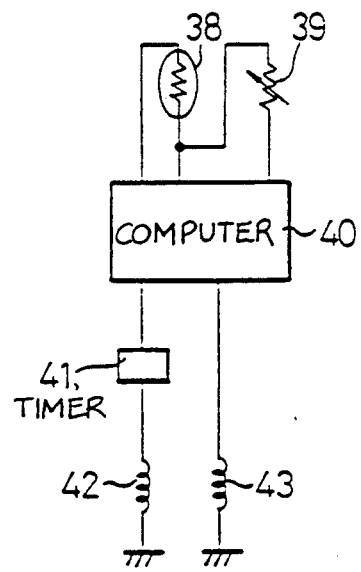
FIG. 18 shows a further embodiment of the controlling unit, FIG. 19 explains operation of the controlling unit shown in FIG. 18, and FIG. 20 explains the effect of the valve relating to the controlling unit shown in FIG. 18.
Figure 19:
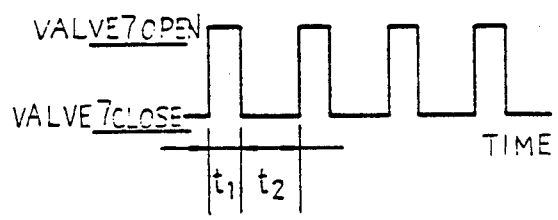

FIG. 18 shows the controlling unit equipped in the automotive air conditioner of a sixth embodiment. Numeral 38 indicates a detector which detects an atmospheric temperature, numeral 39 shows a variable register which sets the target temperature, numeral 40 shows a microcomputer, numeral 41 shows a timer the operation of which is illustrated in FIG. 19, numeral 42 shows a first solenoid coil of the first electromagnetic valve 7 and numeral 43 shows a second solenoid coil for the second electromagnetic valve 8. Since the controlling unit of the sixth embodiment employs the timer 41 which is provided in series with the first solenoid coil 42, the first electromagnetic valve 7 provided at the upper stream side of the container 6 repeats the opening condition (a predetermined period T1) and the closing condition (a predetermined period T2) as shown in FIG. 19 when the automotive air conditioner enters the separating mode, while the second electromagnetic valve 8 is closed.

Figure 20:
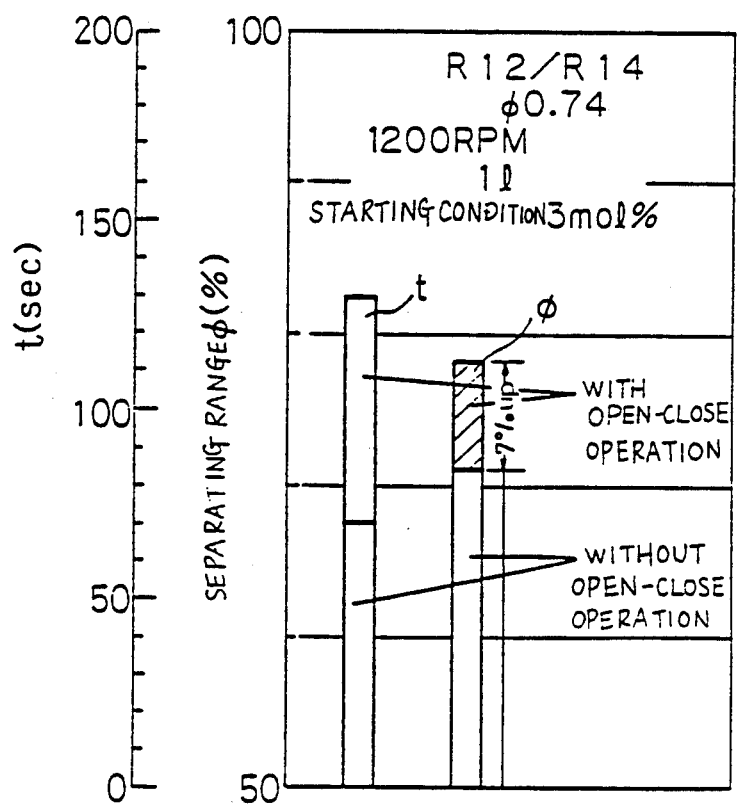

Since about one half of the total quantity of the coolant circulating in the refrigerant circuit is stacked within the receiver 3, and since the liquid phase coolant within the receiver 3 is evaporated and mixed with the gas phase coolant at the upper portion of the receiver when the gas phase coolant at the upper portion of the receiver 3, which contains much lower boiling point coolant, is introduced into the container 6 rapidly, it is important for controlling the transfer speed of the gas phase coolant from the receiver 3 toward the container 6 for ceasing the rapid reduction of the coolant pressure in the receiver 3 which causes the evaporation of the liquid phase coolant in the receiver 3. In other words, the gas phase coolant in the receiver 3 should be transferred to the container 6 slowly. The repeating operation of the opening and closing of the first electromagnetic valve 7 is employed for making the transferring speed of the coolant slow. The effect of this embodiment is explained by using FIG. 20. In FIG. 20 a separating time T and a separating range $\phi$ percentage are compared between the air conditioner with an intermittently operating valve 7 and the air conditioner without the same. Though the air conditioner with the intermittently operating valve 7 requires more time for separating, the conditioner can increase the separating capacity.

As explained above, the air conditioner relating to the present invention can increase the cooling efficiency when the lower boiling point coolant is mixed and circulated in the refrigerant circuit, so that the automotive air conditioner can reduce the temperature in the compartment room rapidly even though the engine speed is low enough. The automotive air conditioner relating to the present invention also can reduce the driving energy for operating the conditioner when the lower boiling point coolant is separated and stacked in the container.

What is claimed is:

1. An automotive air conditioner comprising:
    a compressor for introducing a mixed coolant mixing a higher boiling point coolant and a lower boiling point coolant and for compressing and discharging the coolant,
    a condenser for receiving a compressed coolant from said compressor and condensing the coolant,
    a receiver for receiving the condensed coolant from said condenser and stacking the condensed coolant therein so that a condensed liquid phase coolant is stacked in the lower portion of said receiver and a gas phase coolant is positioned in an upper portion of aid receiver,
    an expansion valve for receiving the liquid phase coolant from said receiver and expanding the coolant,
    an evaporator for receiving the expanded coolant from said expansion valve and evaporating the coolant therein,
    a conduit for connecting said compressor, said condenser, said receiver, said expansion valve and said evaporator for forming a refrigerant circuit,
    a stacking container connected to the upper portion of said receiver for receiving the gas phase coolant in said receiver and connecting to a suction side of said compressor for flowing the coolant within said stacking container toward said compressor, said stacking container stacking a coolant therein,
    a first valve provided on a conduit connecting said receiver and said stacking container for controlling a flow of the coolant from said receiver to said stacking container,
    a second valve provided on a conduit connecting said stacking container and the suction side of said compressor for controlling a flow of the coolant from said stacking container toward said compressor, and
    a controlling unit for controlling an operation of said first valve and said second valve so that the lower boiling point coolant is separate from the refrigerant circuit and stacked in said stacking container when the automotive air conditioner is in a separating mode and that the lower boiling point coolant is mixed with the higher boiling point coolant and the mixed coolant circulates in the refrigerant circuit when the automotive air conditioner is in a mixing mode.

2. An automotive air conditioner according to claim 1, wherein:
    said controlling unit for making said first valve close and said second valve open for introducing the coolant within said stacking container to the refrigerant circuit when said refrigerant circuit requires a high cooling efficiency and said controlling unit makes said first valve open and said second valve close for separating the coolant within the upper portion of said receiver and stacking the coolant within said stacking container when the refrigerant circuit does not require high cooling efficiency.

3. An automotive air conditioner claimed in claim 1, wherein, said controlling unit makes said first valve open and close the conduit connecting said receiver and said stacking container repeatedly when the automotive air conditioner is in the separating mode so as to control a flow rate of the coolant from said receiver to said stacking container so that the coolant in said receiver does not reduce a pressure thereof abruptly for ceasing an evaporation of the liquid phase coolant in said receiver.

4. An automotive air conditioner claimed in claim 1, wherein, said controlling unit makes said first valve close and said second valve open for introducing the coolant within said stacking container to the refrigerant circuit so that a lower boiling point coolant within said stacking container is mixed to the coolant circulating to the refrigerant circuit, said controlling unit makes said first valve open and said second valve close for separating the lower boiling point coolant in the upper portion of said receiver and stacking within said stacking container, and said controlling unit makes said first valve open and said second valve open immediately before the separating mode that said controlling unit makes said first valve open and said second valve close for driving the coolant remaining in said stacking container out.

5. An automotive air conditioner claimed in claim 4, wherein, said controlling unit maintains a driving condition in which said controlling unit makes said first valve open and said second valve open for about 3-6 seconds.

6. An automotive air conditioner claimed in claim 4, wherein, said controlling unit operates a driving condition that said controlling unit makes said first valve open and said second valve open when a pressure of the coolant in the upper portion of said receiver is higher than a predetermined pressure.

7. An automotive air conditioner claimed in claim 1, wherein, a switching valve for switching a connecting condition between a first condition wherein said receiver is connected to said stacking container and a second condition wherein said container is connected to a suction side of said compressor is used as said first valve and said second valve.

8. An automotive air conditioner comprising, a refrigerant circuit circulating a mixed type coolant mixing a higher boiling point coolant and a lower boiling point coolant, and having a compressor, a condenser, a receiver, an expansion means and an evaporator and a stacking container connecting to an upper portion of said receiver and a portion between said expansion means and a suction side of said compressor, a first valve means for controlling flow of the coolant from said receiver to said stacking container, a second valve means for controlling a flow of the coolant from said stacking container to said refrigerant circuit, a pressure detector detecting a pressure of said refrigerant circuit at a portion between a discharge portion of said compressor and said expansion means, and a controlling means for controlling an operation of said first valve means and said second valve means, wherein said controlling means makes said first valve and said second valve close for holding the lower boiling point coolant within said stacking container, said controlling unit makes said first valve close and said second valve open for mixing the coolant within said stacking container to the coolant circulating in said refrigerant circuit, said controlling means makes said first valve open and said second valve open when a pressure detected by said detecting means is higher than a predetermined value for driving a coolant within said stacking container out to said refrigerant circuit, and said controlling unit makes said first valve open and said second valve close for separating the lower boiling point coolant in an upper portion of said receiver and stacking within said stacking container.

9. An automotive air conditioner claimed in claim 8, wherein, said controlling means selects an operation of said first valve means and said second valve means in accordance with a select switch operated by an operator.

* * * * *